(12) United States Patent
Trieber

(10) Patent No.: US 9,462,330 B2
(45) Date of Patent: Oct. 4, 2016

(54) MULTIMEDIA AUDIO INSERTER

(71) Applicant: Transformative Engineering, Inc., Norwood, MA (US)

(72) Inventor: Jay Alan Trieber, Norwood, MA (US)

(73) Assignee: TRANSFORMATIVE ENGINEERING, INC., Norwood, MA (US)

( * ) Notice: Subject to any disclaimer, the term of this patent is extended or adjusted under 35 U.S.C. 154(b) by 0 days.

(21) Appl. No.: 14/840,541

(22) Filed: Aug. 31, 2015

(65) Prior Publication Data

US 2016/0073158 A1 Mar. 10, 2016

Related U.S. Application Data

(60) Provisional application No. 62/045,773, filed on Sep. 4, 2014.

(51) Int. Cl.
| | |
|---|---|
| *G06F 17/00* | (2006.01) |
| *H04N 21/4363* | (2011.01) |
| *H04S 1/00* | (2006.01) |
| *H04N 21/81* | (2011.01) |
| *H04R 5/04* | (2006.01) |

(52) U.S. Cl.
CPC .... *H04N 21/43635* (2013.01); *H04N 21/8106* (2013.01); *H04S 1/002* (2013.01); *H04R 5/04* (2013.01); *H04R 2420/09* (2013.01); *H04S 2400/05* (2013.01)

(58) Field of Classification Search
CPC ............ H04N 21/8541; H04N 7/17318; H04N 21/43635; H04N 21/8106; H04S 1/002; H04S 2400/05; H04R 2420/09; H04R 5/04

See application file for complete search history.

(56) References Cited

U.S. PATENT DOCUMENTS

| | | | |
|---|---|---|---|
| 8,108,567 B2 | 1/2012 | Bohm | |
| 8,601,520 B2 | 12/2013 | Yoshida | |
| 2006/0130121 A1* | 6/2006 | Candelore | G11B 27/034 725/145 |
| 2007/0044137 A1* | 2/2007 | Bennett | G10H 1/366 725/141 |
| 2008/0320545 A1* | 12/2008 | Schwartz | H04N 7/17318 725/135 |
| 2012/0236949 A1 | 9/2012 | Keating | |
| 2014/0040931 A1* | 2/2014 | Gates, III | H04N 21/251 725/14 |
| 2015/0058709 A1* | 2/2015 | Zaletel | G06F 3/14 715/202 |

* cited by examiner

*Primary Examiner* — Simon Sing
*Assistant Examiner* — Eugene Zhao
(74) *Attorney, Agent, or Firm* — James Ernstmeyer

(57) ABSTRACT

In one embodiment, a multimedia audio inserter removes the left and right audio channel data from a multimedia signal, for example an HDMI® signal and replaces it with an alternate audio signal, which may be the center channel audio signal provided by a digital surround sound receiver. In exemplary applications, the resulting, modified multimedia signal may be provided to a digital television that is part of a surround sound system, enabling the television to play the center channel signal through its speakers. Optionally, the multimedia audio inserter may provide a copy of the multimedia signal at a multimedia feedthrough output. In exemplary applications, the multimedia feedthrough output may be used to play left and right channel audio, present in the HDMI® signal, through dedicated left and right speakers.

15 Claims, 4 Drawing Sheets

MULTIMEDIA AUDIO INSERTER

CROSS REFERENCE TO RELATED APPLICATION

This application claims the benefit of U.S. Provisional Application No. 62/045,773, filed Sep. 4, 2014, the entire contents of which are incorporated by reference as if set forth at length herein.

TECHNICAL FIELD

Embodiments of the invention relate generally to digital audiovisual communications and, in particular, to consumer electronic equipment for digital surround sound presentation.

BACKGROUND

The High-Definition Multimedia Interface (HDMI®) has become the prevailing interface standard for transmitting digital video and audio data from high bandwidth audiovisual (AV) source devices to display devices. Examples of AV source devices include Blu-ray Disc and High Definition Digital Versatile Disc players. Examples of AV display devices include video projectors, digital televisions, and surround sound receivers. Certain AV source devices provide audio signals for surround sound, which is a method for improving the quality of sound reproduction. Surround sound systems include audio channels for speakers that surround the listener to the sides and rear, in addition to center, left, and right channels (the "screen channels"), which are intended for speakers arranged in the listener's forward direction.

In a typical surround sound system, the screen channels are connected to speakers that are integrated in a digital television and/or speakers installed as in-wall architectural units. Of the screen channels, the center channel is the most important, because it conveys the sound that corresponds to the action being displayed in the television picture. For example, the dialog that accompanies a television picture is critical to understanding the action and story, and it is typically carried on the center channel.

In spite of its importance to audiovisual presentations, the center channel signal in a home theater system is generally played on a speaker selected not on the basis of optimal sound quality, but on the basis of the space available and the aesthetic concerns of the homeowner. In instances where a dedicated center channel speaker is not practical, for example when installing a large flat-panel television over a fireplace, the standard practice of the home theater industry has been to direct the center channel audio identically to the left and right speakers, a technique known as creating a phantom center.

The phantom center technique defeats the stereophonic separation of the left and right channels and makes the dialog less intelligible. It also destroys the movement of sound (called "panning") from side through center to side, which is essential to the surround sound experience. With the increasing use of large flat panel televisions as part of surround sound systems, more and more listeners settle for the degraded quality of phantom center sound because it is impractical to install a dedicated center channel speaker. For the foregoing reasons, there is a need for an apparatus that improves the quality of stereophonic sound in surround sound systems that lack a dedicated center channel speaker.

SUMMARY

In general, various aspects of the present invention are directed to a multimedia audio inserter that replaces the audio data in a multimedia signal with an alternate audio signal. In an exemplary use, the alternate audio signal may be a pure center channel signal, and the output of the multimedia audio inserter may be connected to a digital television that is part of a surround sound system, which then plays the pure center channel though the television's integrated speakers. Optionally, the multimedia audio inserter may pass through a duplicate of the original multimedia signal, which may be connected within the surround sound system for standard processing. In this manner, the center channel sound seems to originate from the television picture itself, while the left and right channels can be directed to dedicated left and right speakers, which may be in-wall architectural units, thereby achieving the best possible stereophonic surround sound.

In general, in one aspect, embodiments of the invention feature a multimedia audio inserter that includes a de-audio device and an audio injection device. The de-audio device receives a first multimedia input signal, separates the first multimedia input signal into one or more audio signals and one or more video signals, and outputs one or more de-audio signals. The de-audio signals include the video signals and fewer than all of the audio signals. The audio injection device is coupled to the output of the de-audio device and configured to receive alternate audio signals and combine them with the one or more de-audio signals to form a modified multimedia signal.

Optionally, the multimedia audio inserter may also include a multimedia input device, a multimedia output device, and a multimedia feedthrough output. The multimedia input device receives an external multimedia signal and transmits the first multimedia input signal and a second multimedia input signal, both of which are identical to the external multimedia signal. The multimedia output device communicates the modified multimedia signal to a first audiovisual display device. The multimedia feedthrough output communicates the second multimedia input signal to a second audiovisual display device. In various embodiments, the first audiovisual display device and the second audiovisual display device may be one device.

In general, in another aspect, a multimedia audio inserter according to the present invention includes a multimedia input that receives a multimedia input signal, a de-audio device coupled to the multimedia input, an audio input for receiving an alternate audio signal, an audio injection device coupled to the output of the de-audio device, a multimedia output coupled to the audio injection device, a feedthrough output, coupled to the multimedia input, a system power input, coupled to the de-audio device and the audio injection device, and a status indicator. The de-audio device removes one or more existing digital audio data channels from the multimedia input signal to form a de-audio signal. The audio injection device inserts the alternate audio signal into the de-audio signal in place of the one or more existing digital audio data channels to form a modified multimedia signal. The multimedia output communicates the modified multimedia signal to a first audiovisual display device. The feedthrough output communicates the multimedia input signal to a second audiovisual display device. The status indicator indicates the status of one or more of the system power, the multimedia input and the audio input.

Optionally, the first audiovisual display device and the second audiovisual display device may be one device. In various embodiments, the existing digital audio data channels may contain left and right speaker channels, which may have been mixed with a center channel audio signal. The alternate audio data may be a center channel audio signal from a digital surround sound receiver. The first audiovisual display device may be a digital television, able to produce the sound of the alternate audio data on its speakers.

In general, in yet another aspect, embodiments of the invention feature a method for inserting alternate audio data into a multimedia signal. The method includes separating the multimedia signal into existing audio signals and one or more video signals, and inserting the alternate audio data in place of one or more of the existing audio signals to form a modified multimedia signal.

Optionally, the method may also include duplicating the multimedia signal to form a multimedia feedthrough signal, communicating the modified multimedia signal to a first audiovisual display device, and communicating the multimedia feedthrough signal to a second audiovisual display device. The method may further include receiving the multimedia signal from the monitor output of a first digital surround sound receiver, and receiving the alternate audio data from the center channel output of the first digital surround sound receiver.

In various embodiments, the one or more of the existing audio signals may be left and right speaker channels, which may have been mixed with a center channel audio signal. The alternate audio data may be a center channel audio signal. The first audiovisual display device may be a digital television, while the second audiovisual display device may be a second digital surround sound receiver that transmits left and right channel audio signals derived from the multimedia feedthrough signal.

In various embodiments, the method may include producing the sound of the center channel audio signal on the speakers of the digital television, and producing the sound of the left and right channel audio signals on dedicated left and right speakers.

BRIEF DESCRIPTION OF THE DRAWINGS

These and other features, aspects, and advantages of the present invention will become better understood by reference to the following detailed description of certain embodiments, the appended claims, and the accompanying drawings where:

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The term "comprises" and grammatical equivalents thereof are used herein to mean that other components or steps are optionally present. For example, an article "comprising components A, B, and C can consist of (i.e., contain only) components A, B, and C, or can contain not only components A, B, and C but also one or more other components.

The term "multimedia," as used herein with reference to signals or data, means an electronic audio and visual data transmission format, for example, the High-Definition Multimedia Interface, or HDMI® 1.0 through HDMI® 1.4a, or later, format.

A conventional surround sound system that utilizes audiovisual signals transmitted according to the High-Definition Multimedia Interface (HDMI®) standard is constrained to send component audio and visual channel information to the display devices dictated by the HDMI® communication channel protocols. An HDMI® source device uses the Enhanced Extended Display Identification Data Standard (E-EDID) protocol to learn the audio or video formats accepted by the HDMI® display devices to which it is connected, and then sends only preconfigured data channels to each display device. In particular, on the basis of the E-EDID data, the HDMI® source device inflexibly sends to a stereo digital television, a mixed-down, two channel audio stream having the source center channel mixed equally into the stereo signals directed to the left and right speaker channels of the television, providing a phantom center. The resulting phantom center is less intelligible than the source center audio. The inflexibility of conventional surround sound systems thereby degrades the quality of the audio.

Figure 1:
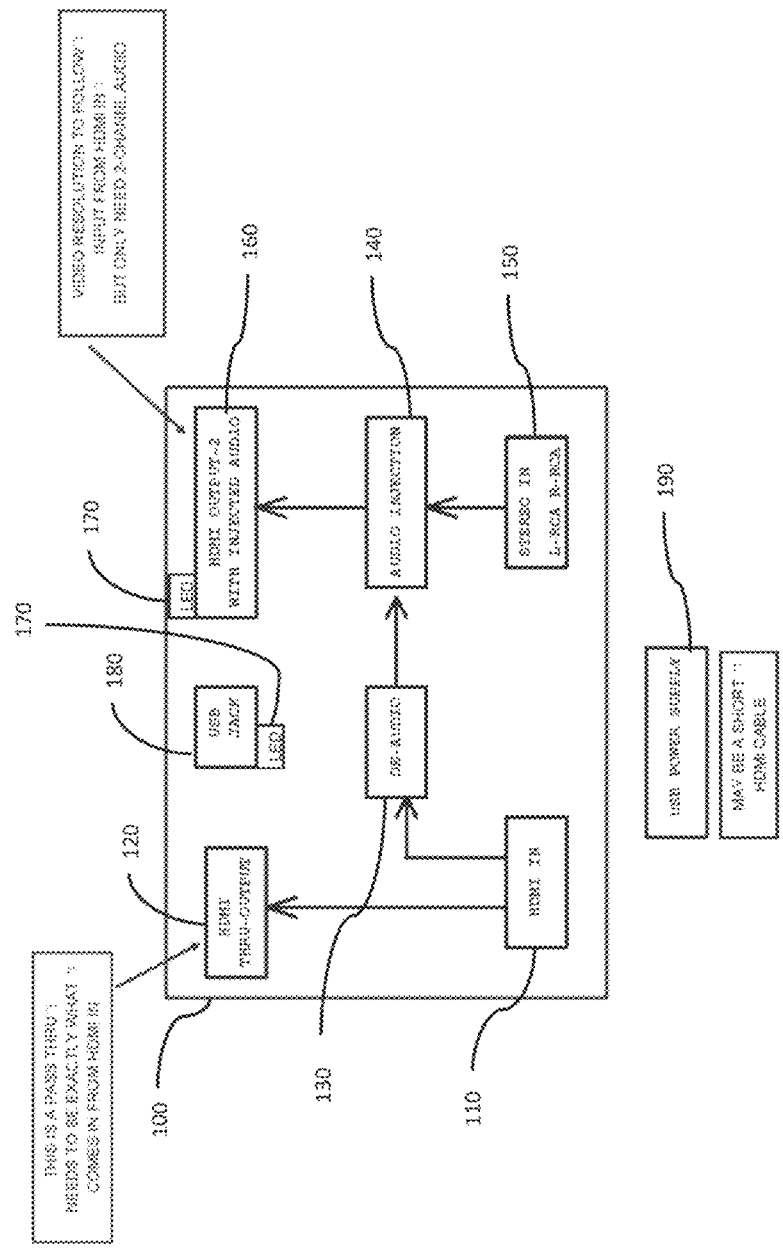
FIG. 1 is a block diagram of an exemplary multimedia audio inserter.

Referring to FIG. 1, an exemplary multimedia audio inserter 100 according to the present invention permits a flexible mapping of source channels to speakers in a stereophonic system. In embodiments, the multimedia audio inserter 100 comprises a multimedia input, for example an HDMI® input 110, electrically connected to a multimedia feedthrough output, for example an HDMI® feedthrough output 120 and to a de-audio device 130. The output of the de-audio device 130 is connected to the digital audio input of an audio injection device 140, which also receives an analog audio input from a stereo input 150. In embodiments, the output of the audio injection device 140 is connected to a modified HDMI® output 160. Optionally, the multimedia audio inserter 100 includes one or more light emitting diodes (LEDs) 170 for status display and a USB jack 180 to receive power or programming signals. It will be appreciated that while FIG. 1 illustrates a specific allocation of functions among the components of the exemplary multimedia audio inserter 100, the functions described may be distributed across electronic components in a number of ways, or all of the functionality may be integrated into a dedicated, stand-alone device or other hardware, using electronic devices and designs that are well known in the art of electronics.

Turning to the components of the exemplary multimedia audio inserter 100 in further detail, in embodiments, the HDMI® input 110 may receive a standard specification HDMI® input signal, for example an HDMI® 1.0 through HDMI® 1.4a, or later, signal. Examples of source devices that provide such a signal include the monitor output of an audio-video surround sound receiver. The HDMI® input signal may include embedded/encoded multi-channel audio, but this content is not required. No prior processing of the HDMI® input signal is necessary. The HDMI® input 110 splits the HDMI® input signal into two identical digital copies.

In embodiments, the HDMI® feedthrough output 120 communicates a duplicate of the HDMI® input signal from the HDMI® input 110, passed through without change. The signal provided at the HDMI® feedthrough output 120 is used for normal audio/video processing within a surround sound system. For example, the HDMI® feedthrough output 120 may provide a signal to a monitor TV, a signal processor, or other video or audio display device.

In embodiments, the de-audio device 130 removes all digital and analog audio content from the HDMI® input signal received from the HDMI® input 110. The de-audio device 130 may achieve this result by separating the HDMI® input signal into one or more digital audio signals and one or more video signals, and outputting one or more de-audio signals. The de-audio signals include all of the video signals but fewer than all of the audio signals. Examples of a de-audio device 130 may be implemented using a commercially available integrated circuit device, such as the EP92A4E provided by Explore Microelectronics Inc., that supports HDCP (High-bandwidth Digital Content Protection) decryption and re-encryption, audio input and output, and other functions necessary to parse the HDMI® input signal.

In embodiments, the audio injection device 140 digitizes and inserts the analog audio content from the stereo input 150, encoded as standard HDMI® audio data according to the audio levels present in the HDMI® input signal upstream of the de-audio device 130. The audio injection device 140 may combine the analog audio content with the one or more de-audio signals to form a modified HDMI® signal.

In embodiments, the stereo input 150 receives the analog audio input intended to replace the audio data removed from the HDMI® input signal by the de-audio device 130. The stereo input 150 may be configured as a pair of phono jacks (also known as RCA jacks) for receiving left and right stereo audio signals, connected to a stereo/monaural switching circuit to allow for single-channel or dual-channel input with dual-channel effect. In such an example, a dual-channel input produces a stereophonic output. In embodiments, the stereo input 150 may receive the analog audio input signal from the center channel output of a digital surround sound receiver, but any high-level (0.7-2.0 V), high output impedance (10K-50K ohm) signal may be used to drive the stereo input 150.

In embodiments, the modified HDMI® output 160 communicates an HDMI® signal in which the audio data in the HDMI® input signal has been replaced by the audio content supplied to the stereo input 150. The modified HDMI® output 160 may be connected to a standard digital television or another other HDMI®-enabled audio/visual display device for standard processing under HDMI® protocols.

In embodiments, light emitting diodes (LEDs) 170 may be used to indicate the status of the system power 190, stereo input 150, and HDMI® input 110. For example, a power LED may be illuminated when system power 190 is present; a phono input LED may be illuminated when an optional audio input selector switch is set to select the stereo input 150; and an HDMI® LED may be illuminated when an HDMI® input signal is present at the HDMI® input 110.

In embodiments, the USB jack 180 may be used to introduce firmware updates to a multimedia audio inserter 100, revising its operating software, or to supply external power, for example a 5 V input.

Figure 2:
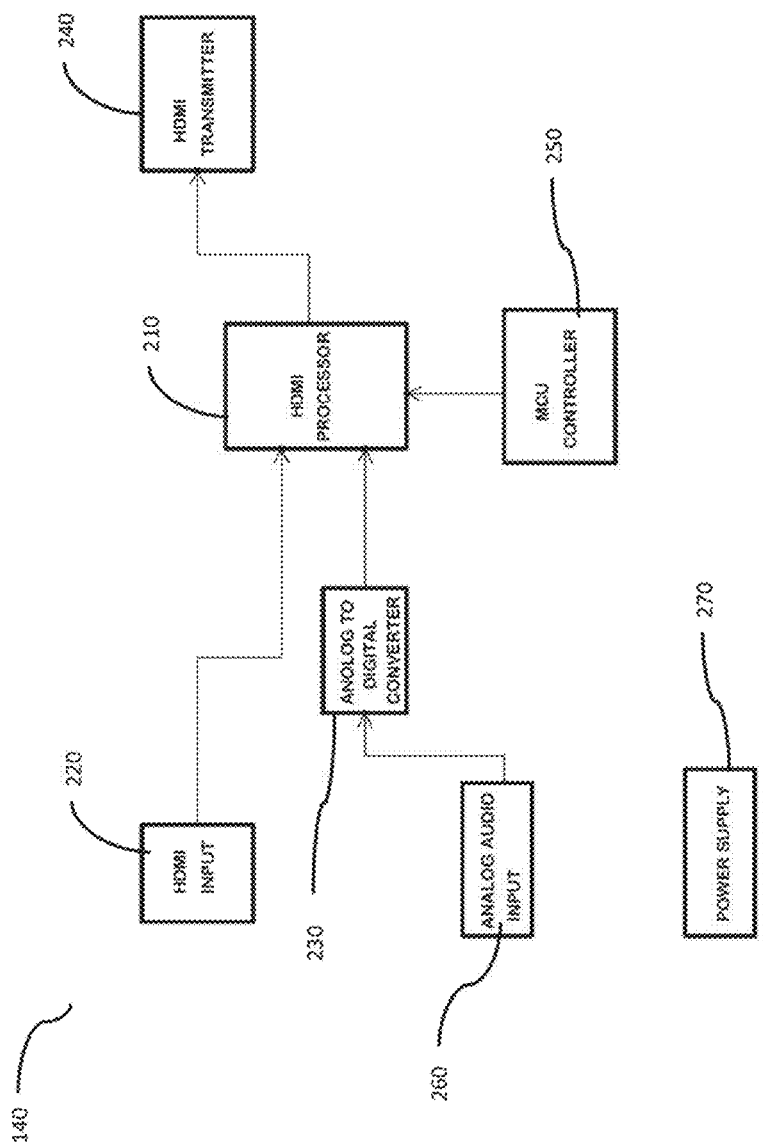
FIG. 2 is a block diagram of an exemplary audio injection device.

Referring to FIG. 2, an exemplary audio injection device 140 comprises an HDMI® processor 210, which receives an HDMI® signal from an HDMI® input 220 and an arbitrary digital audio signal from an analog to digital converter 230, and provides an HDMI® output signal embedding the arbitrary digital audio to an HDMI® transmitter 240. In embodiments of a multimedia audio inserter 100, the HDMI® signal may comprise the de-audio signals received from the de-audio device 130, as illustrated in FIG. 1. The HDMI® processor operates under the control of an HDMI®/HDCP controller 250, which supports HDCP decryption and re-encryption, audio input and output, and other functions necessary to parse the digital signal from the HDMI® input 220 and reassemble it to form the HDMI® output signal. The analog to digital converter 230 may digitize an analog audio signal received from an analog audio input 260. The audio injection device 140 may include a power input 270.

It will be appreciated that while FIG. 2 illustrates a specific allocation of functions among the components of an exemplary audio injection device 140, the functions described may be distributed across electronic components in a number of ways, or all of the functionality may be integrated into a dedicated, standalone electronic device or other hardware, using electronic devices and designs that are well known in the art of electronics. For example, an exemplary audio injection device 140 may be implemented using the EP92A4E sold by Explore Microelectronics Inc.

Figure 3:
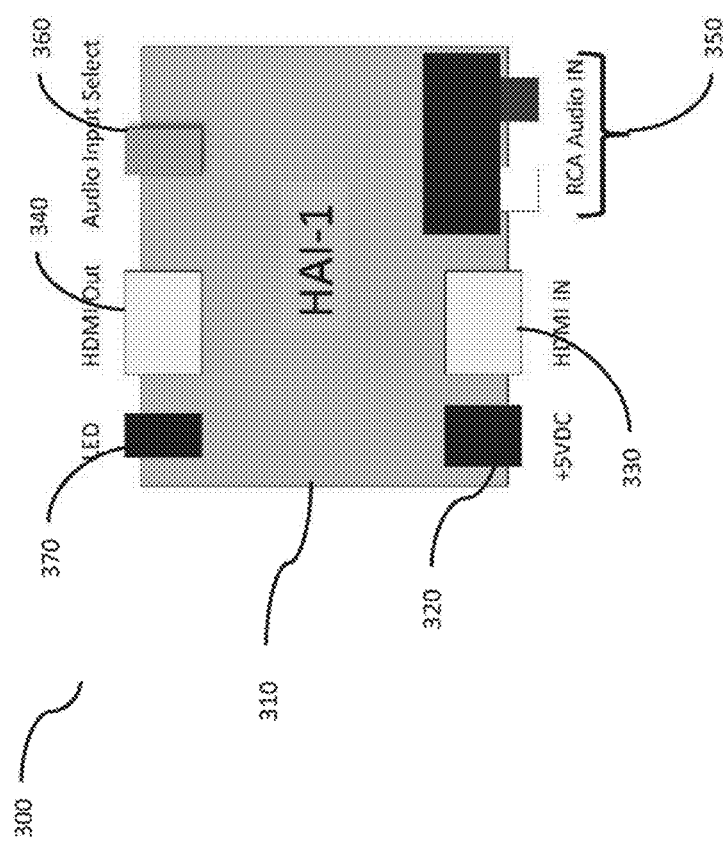
FIG. 3 illustrates an embodiment of a multimedia audio inserter appliance.

Referring to FIG. 3, an exemplary multimedia audio inserter appliance 300 comprises a housing 310 and various electrical connectors and human interface features. The electrical connectors may include a power input connector 320, to which a source of electrical power is connected, preferably supplying +5 V direct current up to 1 A, for a typical power consumption of 2 watts. It will be appreciated that developments in low power electronics may reduce the power consumption of the appliance 300, and that it may receive power in alternate formats, for example from internal batteries, wireless transmission or signal power.

The exemplary multimedia audio inserter appliance 300 also includes an HDMI® input connector 330 and an HDMI® output connector 340, capable of receiving and transmitting, respectively, HDMI® signals according to the HDMI® 1.0 through HDMI® 1.4a specification, or later, including Ultra High-Definition, or 4K video resolution, HDMI® signals. The HDMI® output connector 340 may incorporate digital audio channels derived from the HDMI® input connector 330, or from an audio input connector 350, according to a selection made by the listener. In embodiments, the audio input connector 350 may receive a stereo audio channel input with a 96 ksamples per second sampling rate and a 98 dB signal to noise ratio.

The human interface of the exemplary multimedia audio inserter appliance 300 may include an audio input selector 360, which may be a toggle switch, pushbutton switch, a touchpad, or another device capable of receiving tactile input from a listener. A listener uses the audio input selector 360 to configure the appliance 300 to include audio data from either the HDMI® input connector 330 or the audio input connector 350 in the HDMI® signal provided at the HDMI® output connector 340. In embodiments, the human interface may also include a visual indicator 370, which may comprise one or more light emitting diodes (LEDs), a liquid-crystal display (LCD), or another electronic visual display. In other embodiments, the audio input selector 360 and the visual indicator 370 may be combined into a single device, for example a touchscreen.

Figure 4:
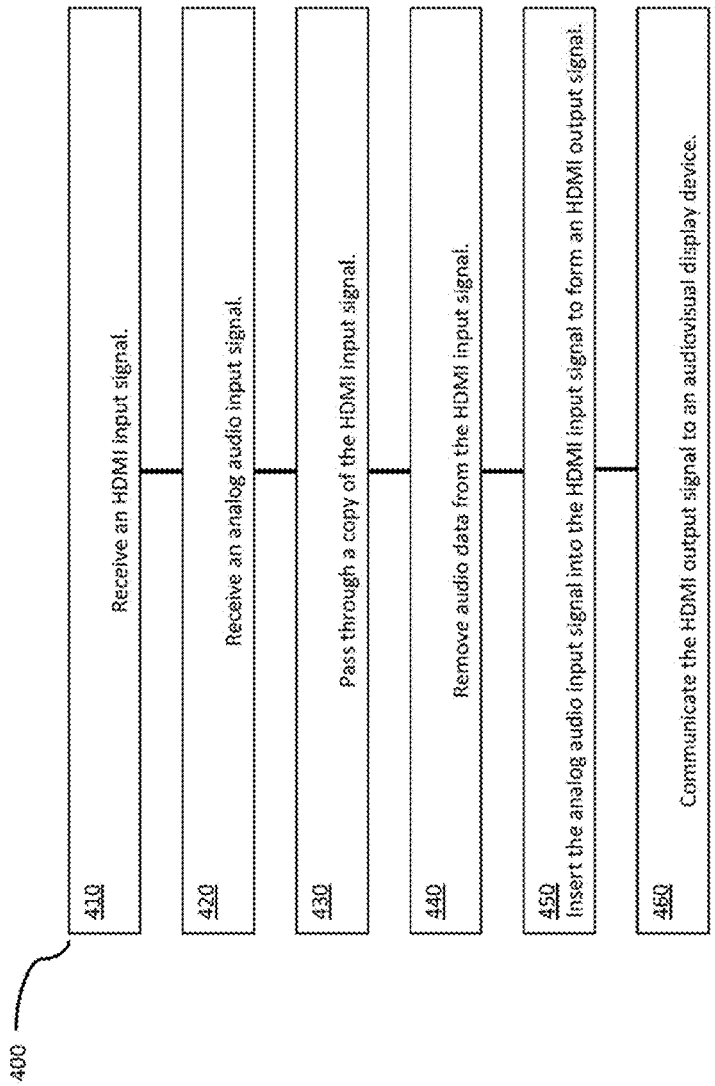
FIG. 4 is a flow chart that represents exemplary operations of a multimedia audio inserter.

Referring FIG. 4, a flowchart 400 represents some exemplary operations of a multimedia audio inserter 100 (shown in FIG. 1). For example, operations of a multimedia audio inserter 100 may include receiving 410 an HDMI® input signal and also receiving 420 analog audio input signal intended to replace the audio content of the HDMI® input signal. In examples, the HDMI® input signal may be the monitor output of an audio-video surround sound receiver, possibly comprising mixed-down, two channel audio data, and the analog audio input signal may be may be the center channel output of a digital surround sound receiver. Upon receiving 410 the HDMI® input signal, the multimedia audio inserter 100 may also pass through 430 a duplicate of the HDMI® input signal. In an exemplary application the duplicate HDMI® signal may provide video data to a monitor television.

After receiving 410 the HDMI® input signal, the multimedia audio inserter 100 may also remove 440 part or all of the existing audio data from the HDMI® input signal. The multimedia audio inserter 100 may then insert 450 a digitized form of the analog audio input in place of the audio content removed from the HDMI® input, thereby creating an HDMI® output signal, which it communicates 460 to an external device, for example a digital television.

In an exemplary application, a listener may use the multimedia audio inserter 100 to remove the mixed-down, two channel audio data that would, in a conventional surround sound system, be provided to the left and right speakers of a digital television, and replace it by an alternate audio signal, preferably the original center channel signal obtained from a digital surround sound receiver. As a result, the television speakers receive only the center channel signal, and the left and right channel audio signals can be directed to dedicated left and right speakers, without being degraded by mixing in the center channel audio. In this manner, the left and right speakers, which can be implemented as in-wall architectural units, receive an improved stereophonic signal.

The previously described versions of the present invention have many advantages, generally improving the quality of the stereophonic sound in a digital surround sound system by preserving a discrete center channel signal, while fulfilling the listener's desire for a simple, clean home theater installation without the need for an awkwardly placed center speaker. Among other advantages, embodiments of the invention fabricated on a single printed circuit board or in a single instrument housing achieve more reliable transmission of digital signals than systems created from separate components at the time of installation in a home theater or other venue. For example, a single-housing or single-board multimedia audio inserter 100 exhibits lower wiring capacitance, shorter ground paths, less coupling of common mode interference, and more accurate impedance matching than systems incorporating wired connections among multiple instrument housings or multiple printed circuit boards.

As a further advantage in educational settings, embodiments of the multimedia audio inserter 100 reduce the expense of distributing sound to audiovisual display devices in classrooms. A common classroom installation will involve a digital television for display of a lesson or computer-based instructional materials. The instructor may have a sound reinforcement microphone that is connected to an external amplifier and external speakers. Using embodiments of a multimedia audio inserter 100, the microphone signal could be sent directly to the classroom television over the same HDMI® wire already running to the television, so that the TV's internal amplifier and speakers serve as the sound system for the classroom. In this manner, a multimedia audio inserter 100 can greatly reduce the time and expense of installing speakers in each classroom. Not all of the foregoing advantageous features or all of the advantages need be incorporated in every embodiment of the invention.

The reader's attention is directed to all papers and documents that are filed concurrently with or previous to this specification in connection with this application and which are open to public inspection with this specification, and the contents of all such papers and documents are incorporated herein by reference.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A multimedia audio inserter for a surround sound system having a center channel speaker replaced by one or more speakers of an audiovisual display device, comprising:
    a multimedia input device that is configured to receive a source multimedia signal from a multimedia source device, the source multimedia signal comprising source audio signals, and that is configured to provide as outputs the source multimedia signal and a feedthrough multimedia signal, the feedthrough multimedia signal being a copy of the source multimedia signal;
    a de-audio device that is configured to receive the source multimedia signal from the multimedia input device, that is configured to separate the source multimedia signal into one or more audio signals and one or more video signals, and that is configured to output one or more de-audio signals, the de-audio signals comprising the video signals and fewer than all of the audio signals;
    an audio injection device that is coupled to the output of the de-audio device, that is configured to receive a center channel audio signal from a center channel output of the multimedia source device, and that is configured to combine the center channel audio signal with the one or more de-audio signals to form a modified multimedia signal, the center channel audio signal forming each of a left and a right speaker channel signal of the modified multimedia signal;
    a multimedia output device that is configured to communicate the modified multimedia signal to the audiovisual display device; and
    a multimedia feedthrough output device that is configured to communicate the feedthrough multimedia signal to a surround sound receiver of the surround sound system; and
    wherein the modified multimedia signal and the feedthrough multimedia signal, in combination with each other by said inserter, are configured so as to provide, as part of the surround sound system, the center channel audio signal and, by a separate connection, at least the source audio signals other than the center channel audio signal.

2. The multimedia audio inserter of claim 1, further comprising:
    a USB input that is coupled to the de-audio device and the audio injection device, and that is configured to provide power and firmware updates to those devices.

3. The multimedia audio inserter of claim 1, further comprising:
    a stereo input that is configured to receive one or more audio input signals; and
    a stereo/monaural switching circuit that is coupled to the stereo input and the audio injection device, and that is configured to receive the audio input signals from the stereo input and to generate therefrom the center channel audio signal.

4. The multimedia audio inserter of claim 1, further comprising:
    a status indicator device that is configured to indicate the status of one or more of the power to the multimedia audio inserter, the source multimedia signal, and the center channel audio signal.

5. The multimedia audio inserter of claim 1, further comprising:
    a USB input that is coupled to the de-audio device and the audio injection device, and that is configured to provide power and firmware updates to those devices;
    a stereo input that is configured to receive one or more audio input signals;
    a stereo/monaural switching circuit that is coupled to the stereo input and the audio injection device, and that is configured to receive the audio input signals from the stereo input and to generate therefrom the center channel audio signal;
    an audio input selector that is coupled to the audio injection device, and that is configured to receive user input to select the source of the center channel audio signal; and
    a status indicator device that is configured to indicate the status of one or more of the power to the multimedia audio inserter, the source multimedia signal, the audio input signals, and the audio input selector.

6. The multimedia audio inserter of claim 5, wherein:
    the audio input signals are left and right stereo audio signals that make up a pure center channel audio signal from a digital surround sound receiver; and
    the stereo input is a pair of phono jacks.

7. The multimedia audio inserter of claim 1, wherein the audio injection device comprises:
    an analog to digital converter that is configured to receive the center channel audio signal in analog format and to generate therefrom alternate digital audio signals;
    a multimedia signal processor that is coupled to the output of the analog to digital converter and the output of the de-audio device, and that is configured to combine the alternate digital audio signals and the de-audio signals so as to form the modified multimedia signal; and
    a multimedia signal processor controller that is coupled to the multimedia signal processor, that is configured to control the multimedia signal processor, and that is configured to perform HDCP decryption and encryption.

8. A multimedia audio inserter comprising:
    a multimedia input device that is configured to receive a multimedia input signal, the multimedia input signal comprising source audio signals;
    a de-audio device that is coupled to the multimedia input device, and that is configured to remove a left screen audio data channel and a right screen audio data channel from the multimedia input signal to form a de-audio signal;
    an audio input device that is configured to receive a center channel audio signal;
    an audio injection device that is coupled to the output of the de-audio device, and that is configured to insert the center channel audio signal into the de-audio signal in place of the left screen audio data channel and the right screen audio data channel so as to form a modified multimedia signal the audio injection device comprising:

an analog to digital converter that is configured to receive the center channel audio signal in analog format and to generate therefrom alternate digital audio signals;

a multimedia signal processor that is coupled to the output of the analog to digital converter and the output of the de-audio device, and that is configured to combine the alternate digital audio signals and the de-audio signals so as to form the modified multimedia signal; and a multimedia signal processor controller that is coupled to the multimedia signal processor, and that is configured to control the multimedia signal processor and to perform HDCP decryption and encryption;

a multimedia output device that is coupled to the audio injection device, and that is configured to communicate the modified multimedia signal to an audiovisual display device of a surround sound system; and a multimedia feedthrough output device that is coupled to the multimedia input device, and that is configured to communicate the multimedia input signal to a surround sound receiver of the surround sound system; and wherein the modified multimedia signal and the multimedia input signal, in combination with each other by said inserter, are configured so as to provide, as part of the surround sound system, the center channel audio signal and, by a separate connection, at least the source audio signals other than the center channel audio signal.

9. The multimedia audio inserter of claim 8, further comprising:

a system power input that is coupled to the de-audio device and the audio injection device; and a status indicator that is configured to indicate the status of one or more of the system power, the multimedia input signal, and the center channel audio signal.

10. The multimedia audio inserter of claim 9, further comprising:

a housing containing at least the de-audio device and the audio injection device; and a printed circuit board contained within the housing and mechanically supporting at least the de-audio device and the audio injection device; and wherein the printed circuit board provides electrical connections between the de-audio device and the audio injection device.

11. A method, performed by a multimedia audio inserter, for generating and presenting multimedia content by a surround sound system, comprising:

receiving a multimedia signal from an audiovisual output of a multimedia source device;

duplicating the multimedia signal so as to form a feedthrough multimedia signal;

receiving, by an audio injection device in said inserter, a center channel audio signal from a center channel output of the multimedia source device;

separating, by a de-audio device in said inserter, the multimedia signal into source audio signals and source video signals; and combining the center channel audio signal and the source video signals, so as to form a modified multimedia signal, the modified multimedia signal having the center channel audio signal in place of each of a left and a right speaker channel of the source audio signals; and wherein the modified multimedia signal and the feedthrough multimedia signal, in combination with each other by said inserter, are configured so as to provide, as part of the surround sound system, the center channel audio signal and, by a separate connection, at least the source audio signals other than the center channel audio signal.

12. The method of claim 11, wherein:

receiving a center channel audio signal comprises selectably receiving either a multimedia signal containing the center channel audio signal or an analog signal representing the center channel audio signal, according to a selection made by a listener.

13. The method of claim 12, wherein:

receiving an analog signal representing the center channel audio signal comprises selectably receiving either a stereo audio signal or a monaural audio signal, according to a selection made by a listener.

14. The method of claim 11, wherein:

the source audio signals comprise a left screen channel and a right screen channel audio signal.

15. The method of claim 14, further comprising:

reproducing the sound of the center channel audio signal on the speakers of an audiovisual display device of the surround sound system; and reproducing the sound of the left screen channel and right screen channel audio signals on dedicated left and right speakers of the surround sound system.

* * * * *